United States Patent [19]

Kublick

[11] 3,835,402

[45] Sept. 10, 1974

[54] VOLTAGE-FREQUENCY CONVERTER

[75] Inventor: Christian Kublick, Erlangen, Germany

[73] Assignee: Siemens Aktiengesellschaft, Munich, Germany

[22] Filed: Mar. 12, 1973

[21] Appl. No.: 340,056

[30] Foreign Application Priority Data

Mar. 16, 1972 Germany........................... 2212792

[52] U.S. Cl.................. 328/181, 307/228, 307/271, 328/127, 331/111, 307/260

[51] Int. Cl. ............................................ H03k 4/08

[58] Field of Search ........... 328/127, 128, 181, 187; 307/228, 235 R, 271, 260; 331/111, 143, 108 C, 108 D

[56] References Cited

UNITED STATES PATENTS

| | | | |
|---|---|---|---|
| 3,047,820 | 7/1962 | Lawton | 328/127 X |
| 3,256,426 | 6/1966 | Roth et al. | 235/183 |
| 3,350,651 | 10/1967 | Davis | 328/127 X |

*Primary Examiner*—John Zazworsky
*Attorney, Agent, or Firm*—Kenyon & Kenyon Reilly Carr & Chapin

[57] ABSTRACT

A voltage-frequency converter is disclosed and has an integrator which acts as a sawtooth generator. A positive or negative input voltage is alternatively connected to the input of the integrator and both voltages are proportional to a reference voltage. One input voltage is preferably taken off at a voltage divider and the second input voltage is derived from the other by means of an inverting amplifier. The integrator is followed by two limit-value stages for determining the reversal points of the sawtooth voltage. Datum voltages are supplied to the limit-value stages and are also proportional to the reference voltage. The voltage appearing at the integrator input is disconnected by the output signals of the limit-value stages upon reaching a reversal point of the sawtooth waveform whereupon the voltage of the opposite polarity is connected. The frequency generated by the voltage-frequency converter is independent of the reference voltage.

11 Claims, 3 Drawing Figures

VOLTAGE-FREQUENCY CONVERTER

BACKGROUND OF THE INVENTION

The invention relates to a voltage-frequency converter with an integrator functioning as a sawtooth generator. A reference voltage is connected to the input of the integrator and a limit stage following the integrator determines a reversal point of the sawtooth voltage.

A voltage-frequency converter of this type is commercially available. With such a converter, an input voltage is converted into a frequency proportional to voltage. The dependence upon voltage is objectionable if a fixed frequency or a stable frequency adjustable over an extended range is to be generated. This can often be corrected by an expensive stabilizing system for the reference voltage. This arrangement, however, is very costly and not always applicable.

SUMMARY OF THE INVENTION

It is an object of the invention to provide a voltage-frequency converter of the type mentioned above wherein the dependence of the frequency upon a reference voltage or an input voltage is avoided.

The voltage-frequency converter of the invention includes as a feature an integrator for generating a sawtooth voltage, that is, a voltage of periodic waveform whose instantaneous value varies substantially linearly with time between two limit values whereat the slope of the waveform changes sign. A first switch and a second switch for transmitting positive and negative integrator input voltages respectively to the input of the integrator is provided, the input voltages being proportional to a reference voltage. A first limit-value stage and a second limit-value stage are respectively connected to the output of the integrator for determining respective ones of the limit values. The limit-value stages have respective inputs for receiving respective datum voltages proportional to the reference voltage. Circuit means monitors the outputs of the stages for opening one of the switches and for closing the other one of the switches at each of the limit values whereby the positive and negative input voltages are supplied sequentially to the integrator. Thus, the switches for the input voltages are under the control of the limit stages and are opened or closed alternately when a reversal point of the sawtooth voltage is reached.

The circuit means can be a memory stage respectively connected to the outputs of the limit-value stages. The memory stage has outputs connected to the switches respectively for transmitting output pulses to the switches to open one of the switches and to close the other one of the switches at each of the limit-values.

Because of the proportionality of the input currents or input voltages of the integrator and the datum voltages of the limit-value stage to a reference voltage, which may, for example, be the supply voltage, there is no voltage dependence of the generated frequency in the voltage-frequency converter according to the invention. Stabilization of the reference voltage is therefore not necessary.

To generate a variable, voltage-dependent frequency, it is advantageous to take off at least one of the input voltages alternatingly applied to the input of the integrator at a voltage divider, across which the reference voltage is connected. The other input voltage may be derived from the first one by means of an inverting amplifier. Thus voltage supply means can be provided for supplying one of the integrator input voltages, and an inverter-amplifier can be connected to the supply means for providing the other one of the integrator input voltages.

It is furthermore advantageous to take off at least one of the datum voltages for the limit-value stages at a voltage divider, across which the reference voltage is connected. The reference voltage at the other limit-value stage can be zero.

In an advantageous subsidiary embodiment of the voltage-frequency converter according to the invention, the output of the integrator is fed to the input of a comparator stage, to the second input of which a comparison voltage is connected which is limited by an upper and a lower limit voltage, which lie between the reversal points of the sawtooth voltage and which are proportional to the reference voltage. This ensures that even in the event of step-like changes, the comparison voltage is situated so that it intersects the sawtooth voltage. If the comparison voltage is the control quantity of a control device with a control amplifier, these limit voltages can be applied to the latter for limiting purposes. Such a pulse generator can be used advantageously as a control unit, for instance, for a converter, where the pulses formed as a function of the comparison voltage can lead or lag the frequency generated by the converter.

The advantages of the voltage-frequency converter according to the invention include that a sawtooth voltage can be generated with the voltage-frequency converter, whose frequency is independent of the reference voltage; this is achieved without appreciable additional cost. The voltage-frequency converter according to the invention can be configured as a pulse generator and, as such, it ensures that at least one pulse is generated in each period of the sawtooth voltage; these pulses can lead or lag the generated frequency as a function of a control voltage. Also, with the sawtooth voltage generator of the invention, a symmetrical sawtooth voltage can be generated without special costly measures, whereby the generation of pulses which are symmetrical with respect to the reversal points of the sawtooth voltage become possible.

Although the invention is illustrated and described herein as a voltage-frequency converter, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS OF THE INVENTION

Figure 1:
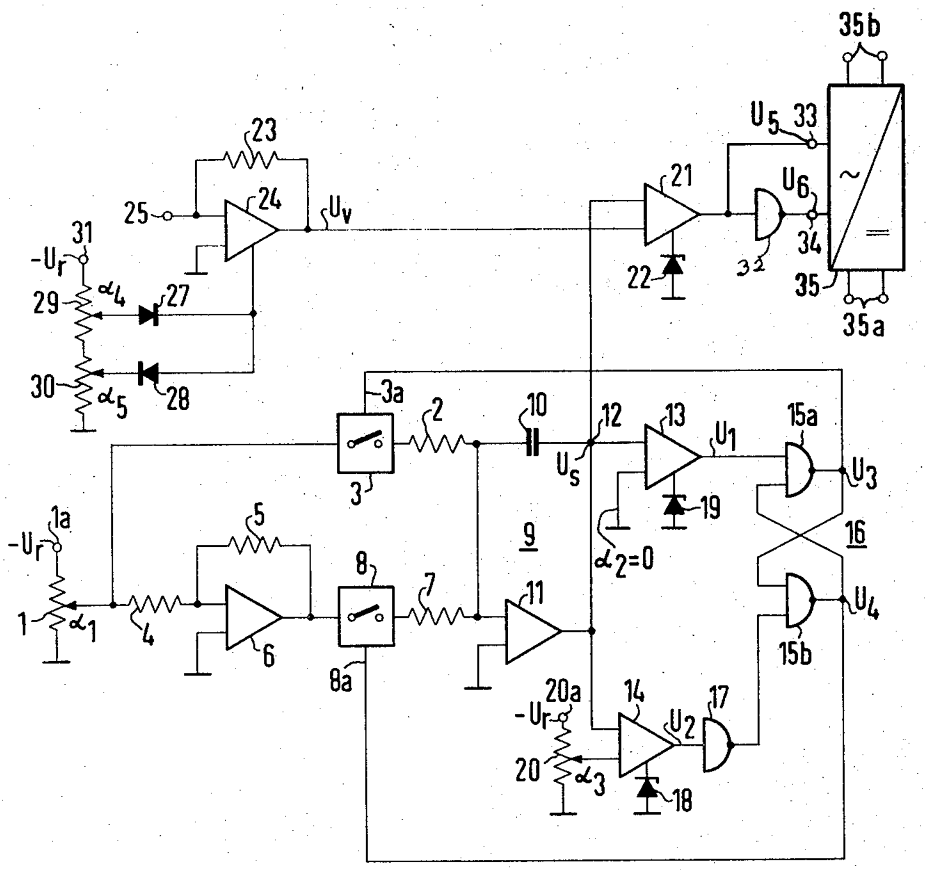
FIG. 1 is a schematic diagram of the circuit of a voltage-frequency converter according to the invention. This diagram also shows how the voltage-frequency converter can be configured to function as a pulse generator.

Referring to FIG. 1, a negative reference voltage $U_r$ is applied to the terminal 1*a* of the voltage divider 1 and the voltage $U_r$ may, for instance, be the supply voltage. The arm of the potentiometer 1 is connected to a switch 3 and, via a resistor 4, with the input of an inverting amplifier 6 having feedback resistor 5. The output of the amplifier 6 is fed to a second switch 8. The switches 3 and 8 may be switches equipped with field-effect transistors which are also known as FET switches and are commercially available. The switches 3 and 8 can be operated via control inputs 3*a* and 8*a* respectively.

If the switch 3 is closed and the switch 8 is open, a negative voltage is applied to the input of an integrator 9 via the resistor 2 and therefore a negative input current is provided to the integrator 9. The order of the switch 3 and the resistor 2 or the switch 8 and the resistor 7 may be interchanged. These input voltages are proportional to the reference voltage $U_r$. The integrator 9 is an amplifier 11 having feedback through a capacitor 10. At the output 12 of the integrator 9 there appears a voltage $U_s$ which rises or falls proportionally with time in correspondence to the polarity of the integrator input voltage.

The voltage at the output 12 is fed to the two limit-value stages 13 and 14, which upon reaching an upper or lower limit, respectively transmit a pulse to a memory stage 16 having NAND gates 15*a* and 15*b*; an inverter stage 17 is interposed between the limit stage 14 and the memory stage 16. The outputs of the memory stage 16 are connected with the control inputs 3*a* and 8*a* of the switches 3 and 8 respectively and these switches are alternatively opened and closed by the output pulses of the memory stage 16 when the integrator output voltage reaches one of the limit-values. If we assume, for instance, that the switch 3 is closed and the switch 8 open, a negative input voltage is present at the integrator 9. At the integrator output 12 one then obtains a rising voltage. When the upper limit is reached, the limit-value stage 13 transmits a signal which closes the switch 8 via the memory stage 16 and opens the switch 3. A positive voltage is now present at the integrator input, and falling voltage is obtained at the integrator output 12, until the lower limit is reached and the switches 3 and 8 are again operated by an output pulse of the second limit-value stage 14. Through the upper and lower limit, the upper and lower reversal point, respectively, of the sawtooth voltage is thereby determined, the slope of which is given by the magnitude of the positive and negative integrator input voltages or currents.

The limit-value stages 13 and 14 are differential amplifiers limited by respective limiting diodes 19 and 18. The second input of the limit-value stage 14 is connected with the tap of a potentiometer 20. A negative reference voltage $U_r$ is connected to the terminal 20*a* of potentiometer 20. The second input of the limit-value stage 13 is at zero potential. Thus, the difference of the reference voltages of the limit stages is proportional to the reference voltage $U_r$. The same proportionality of the reference voltages would be obtained if, different from FIG. 1, the second input of the limit stage 13 were connected (in the same manner as for the limit-value stage 14), with a tap of a potentiometer which is connected with the negative reference voltage $U_r$ or a voltage proportional to the voltage $U_r$.

The integrator output voltage $U_s$ is obtained from the integral $$U_s = \frac{1}{R_i \cdot C} \cdot \int_{t_1}^{t_2} \alpha_1 \cdot U_r dt.$$

In this and the following expressions, $C$ is the capacity of the capacitor 10, and $R_i$ designates the respective resistance value of the resistor whose reference symbol appears as the subscript. The symbol $\alpha_i$ designates the proportionality factors between the reference voltage $U_r$ and the alternately applied input voltages at the integrator 9 or the reference voltages for the limit-value stages 13 and 14. In the illustrated embodiment, these proportionality factors $\alpha_i$ are determined by voltage dividers. In the expression for the integrator output voltage $U_s$, $R_2$ should be substituted for $R_i$ for the rising slope and $R_7$ for the falling slope. For the rising slope $\alpha_i = \alpha_1$, where $\alpha_1$ is the proportionality factor given by the potentiometer $l$, and for the declining slope $\alpha_1 = \alpha_1 \cdot (R_5/R_4)$. If one assumes that also the reference voltage at the limit-value stage 13 is derived from the reference voltage $U_r$ via a potentiometer and that $\alpha_2$ and $\alpha_3$ are the proportionality factors for the limit stages 13 and 14 respectively, one obtains for the duration $t_s$ of the rising slope of the sawtooth voltage $U_s$:

$$(\alpha_2 + \alpha_3) \cdot U_r = (t_s/R_2 \cdot C) \cdot \alpha_1 U_r \; t_s = (\alpha_2 + \alpha_3/\alpha_1) \cdot R_2 \cdot C$$

and for the duration $t_f$ of the declining slope of the sawtooth voltage:

$$(\alpha_2 + \alpha_3) \cdot U_r = (t_f/R_7 \cdot C) \cdot (R_5/R_4) \cdot \alpha_1 \cdot U_r \; t_f = [\alpha_2 + \alpha_3/\alpha_1 \cdot (R_5/R_4)] \cdot R_7 \cdot C$$

From this, the expression for the frequency $f$ of the sawtooth voltage follows:

$$1/f = t_s + t_f = (\alpha_2 + \alpha_3/l) \; [R_2 \cdot C + (R_4/R_5) \cdot R_7 \cdot C]$$

This expression is independent of the reference voltage $U_r$.

With the voltage-frequency converter according to the invention, a frequency independent of the reference voltage $U_r$ is thus generated, the magnitude of which is determined by the values of resistances and/or capacities. The frequency can be changed continuously over a wide range, in particular, by adjusting the arm of the potentiometer 1 and therefore, by changing the proportionality factor $\alpha_1$. The independence of the input voltage or reference voltage is preserved. Stabilizing the input voltage is no longer necessary.

Figure 2:
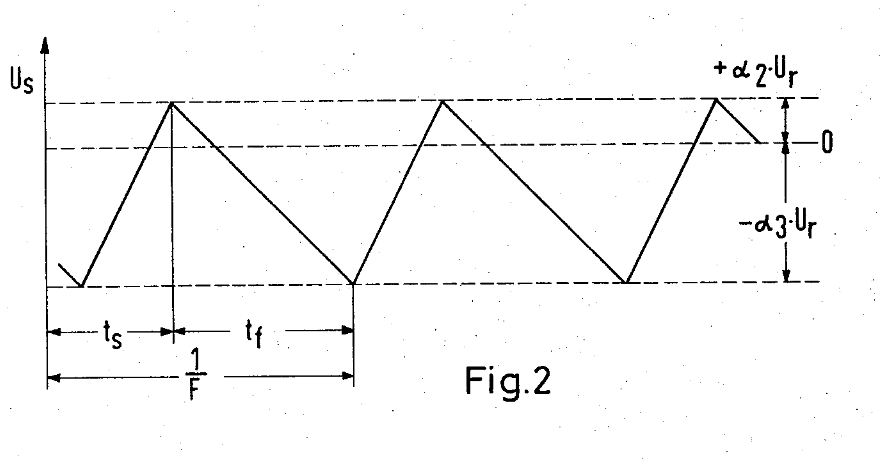
FIG. 2 is the sawtooth voltage waveform which is present at the output of the integrator of the voltage-frequency converter.

In FIG. 2, the sawtooth voltage $U_s$ as it appears across the integrator output 12 is plotted against time. The spacing of the reversal points of the sawtooth voltage is given by the sum of the products $\alpha_2 \cdot U_r$ and $\alpha_3 \cdot U_r$. In FIG. 2, the zero line represents the upper reversal point for the sawtooth voltage for the case $\alpha_2 = 0$, that is, for a grounded second input of the limit-value stage 13. For $t_s = t_f$, that is, for $R_2 = R_7$ and $R_4 = R_5$, a symmetrical sawtooth voltage is obtained.

In FIG. 1, the voltage-frequency converter is supplemented to form a pulse generator which can advantageously be used, for example, as a control unit for the rectifier components of an inverter 35 having input terminals 35*a* to which a d-c voltage is applied and having output terminals 35*b* from which an a-c voltage is obtained. The output 12 of the integrator 9 is fed to one input of the comparator stage 21 which is an amplifier limited by the limiting diode 22. To the second input of the comparator 21 is fed a comparison voltage which is obtained from a regulating amplifier 24 which is provided with feedback via the resistor 23. The resistor 23 may also be a combination of resistive and reactive elements. A control error is present at the input of the regulating amplifier 24 via the terminal 25; this control error is formed, for example, from a reference voltage U* and an actual voltage U. The actual voltage U may, for instance, be the output voltage of an inverter. For limiting purposes, voltages dropping across the potentiometers 29 and 30 are fed to the regulating amplifier 24 via diodes 27 and 28 respectively. The negative reference voltage $U_r$ is connected to the potentiometer terminal 31; this voltage can, for example, be the supply voltage. These limiting voltages are likewise proportional to the reference voltage $U_r$ (proportionality factors: $\alpha_4$ and $\alpha_5$) and ensure that the comparison voltage or control voltage which is fed to the comparator stage 21 always lies between the upper and the lower reversal points of the sawtooth voltage if $\alpha_4 < \alpha_3$ and $\alpha_5 \neq 0$ for $\alpha_2 = 0$. Thus there is always obtained at least one point of intersection between the rising and the falling slope of the sawtooth voltage and the control voltage and thereby at least one pulse for each period of the sawtooth voltage, which appears at the output of the comparator stage 21 and whose leading edge coincides with one point of intersection and whose trailing edge coincides with the next point of intersection. In FIG. 1, the output of the comparator stage is followed by an inverter stage 32. Two complementary pulse trains are thereby obtained at the respective outputs 33 and 34 which can be used, for example, for the control of the rectifier components in a diagonal of an inverter connected in a bridge circuit.

Figure 3:
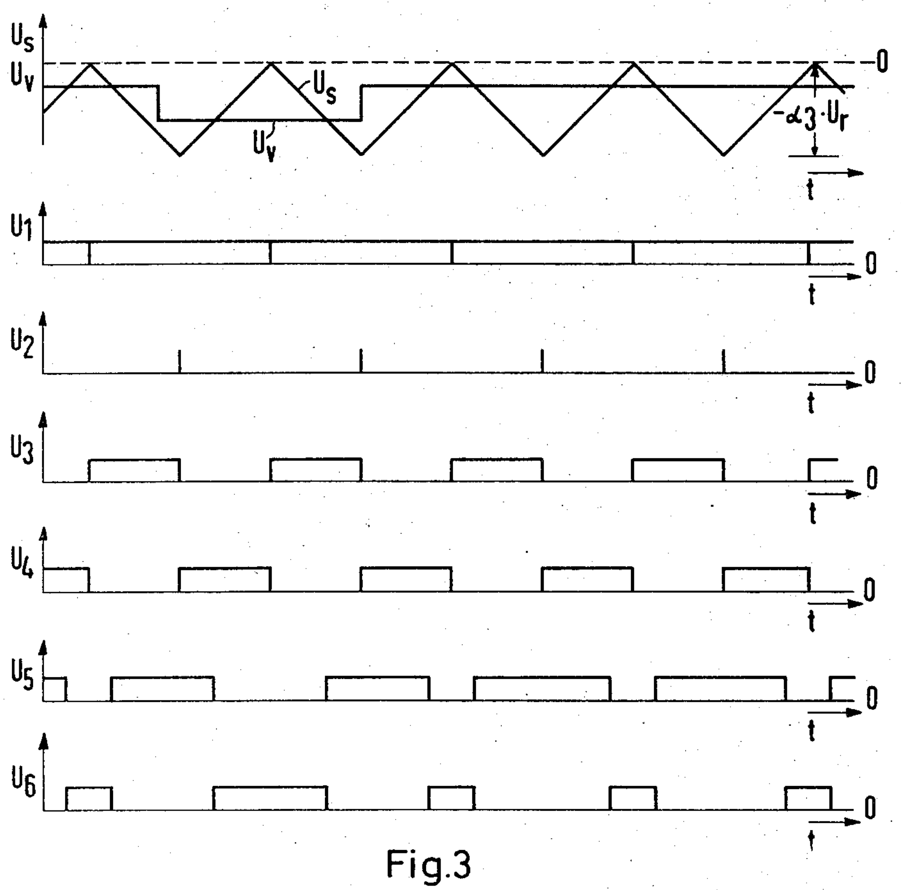
FIG. 3 illustrates waveforms at various locations in the circuit shown in FIG. 1.

In FIG. 3 are shown voltages and pulse trains which appear at the corresponding designated points of the circuit according to FIG. 1. It is assumed here, deviating from FIG. 2, with respect to the sawtooth voltage $U_s$ that the reference voltage for the limit stage 13 is the zero potential ($\alpha_2 = 0$) and that, for generating a symmetrical sawtooth, $R_4 = R_5$ and $R_2 = R_7$ was chosen. The condition $R_4 = R_5$ corresponds to a gain of 1 of the amplifier 6.

Because of the proportionality of the limiting voltages of the regulating amplifier 24 with the reference voltage $U_r$, the control voltage $U_v$ is always between the upper and the lower reversal point of the sawtooth voltage $U_s$. The advantages of this measure have already been discussed in the foregoing.

At the outputs of the limit stages 13 and 14 are produced the trains of spikes $U_1$ and $U_2$ respectively. The spikes $U_1$ correspond to the upper reversal points of the sawtooth voltage, and the spikes $U_2$ to the lower reversal points. These short pulses are fed to the memory stage 16, at the outputs of which the pulse trains $U_3$ and $U_4$ appear. The leading edges of the pulses $U_3$ coincide with a spike which characterizes the upper reversal point of the sawtooth voltage. The position of the trailing edge of the pulse $U_3$ is identical with the position of the spike which is transmitted by the limit stage 14 at the following lower reversal point. The pulse train $U_4$ is complementary to the pulse train $U_3$. By the pulse trains $U_3$ and $U_4$, the switches 3 and 8 are alternately opened and closed with the correct phase and the negative or positive voltage is fed to the input of the integrator 9.

The pulse trains $U_5$ and $U_6$ are generated by the comparator stage 21. Their position corresponds to the intersection points of the sawtooth voltage $U_s$ with the control voltage $U_v$. These pulse trains, which are also complementary to each other, may be used, as already mentioned, for the direct control of the rectifier components of a converter.

What is claimed is:

1. A voltage-frequency converter comprising an integrator for generating a voltage of periodic waveform whose instantaneous value varies substantially linearly with time between two limit values whereat the slope of the waveform changes sign; a first switch and a second switch for transmitting positive and negative integrator input voltages respectively to the input of said integrator, said input voltages being proportional to a reference voltage; a first limit-value stage and a second limit-value stage respectively connected to the output of said integrator for determining respective ones of said limit values, said limit-value stages having respective inputs for receiving respective datum voltages also proportional to the above-mentioned reference voltage whereby the periodic waveform generated by said integrator has a frequency independent of said reference voltage; and circuit means monitoring the outputs of said stages for opening one of said switches and for closing the other one of said switches at each of said limit values whereby said positive and negative input voltages are supplied sequentially to said integrator.

2. The voltage-frequency converter of claim 1 comprising a voltage divider having fixed terminals for receiving the reference voltage thereacross and having an adjustable tap from which one of said integrator input voltages is taken.

3. The voltage-frequency converter of claim 1 comprising a voltage divider having fixed terminals for receiving the reference voltage thereacross and having an adjustable tap from which one of said datum voltages is taken.

4. The voltage-frequency converter of claim 3, the input corresponding to the other one of said datum voltages being connected to zero potential.

5. The voltage-frequency converter of claim 1 comprising a voltage divider having fixed terminals for receiving the reference voltage thereacross and having an adjustable tap from which one of said integrator input voltages is taken, and a second voltage divider having fixed terminals for receiving the reference voltage thereacross and having an adjustable tap from which one of said datum voltages is taken, the input corresponding to the other one of said datum voltages being connected to zero potential.

6. The voltage-frequency converter of claim 1 comprising voltage supply means for supplying one of said integrator input voltages, and an inverter-amplifier connected to said supply means for providing the other one of said integrator input voltages.

7. The voltage-frequency converter of claim 6, said inverter-amplifier having a gain of unity.

8. The voltage-frequency converter of claim 1, said circuit means being a memory stage respectively connected to the outputs of said limit-value stages, said memory stage having outputs connected to said switches respectively for transmitting output pulses to said switches to open one of said switches and to close the other one of said switches at each of said limit-values.

9. The voltage-frequency converter of claim 1 comprising a comparator for providing pulses in the manner of a pulse generator, said comparator having two comparator inputs, one of said comparator inputs being connected to the output of said integrator and the other one of said comparator inputs being connected to receive a comparison voltage.

10. The voltage-frequency converter of claim 9 comprising comparison voltage circuit means for supplying said comparison voltage to said other one of said comparator inputs; and voltage supply means for supplying upper and lower limiting voltages to said comparison voltage circuit means to limit said comparison voltage, said last mentioned limiting voltages being proportional to the reference voltage and lying between the two limit values whereat the slope of the periodic waveform of the voltage generated by said integrator changes sign.

11. The voltage-frequency converter of claim 10 comprising said comparison voltage circuit means being a regulator arrangement for supplying said comparison voltage as the controlled output quantity thereof to said other one of said comparator inputs, said regulator arrangement comprising a regulating amplifier, and said voltage supply means being connected to said regulating amplifier for limiting said comparison voltage.

* * * * *

UNITED STATES PATENT OFFICE
CERTIFICATE OF CORRECTION

Patent No. 3,835,402 Dated September 10, 1974

Inventor(s) Christian Kublick

It is certified that error appears in the above-identified patent and that said Letters Patent are hereby corrected as shown below:

In column 4, line 22, change "$\alpha_1 = \alpha_1 \cdot (R_5/R_4)$" to --$\alpha_i = \alpha_1 \cdot (R_5/R_4)$--

Signed and sealed this 3rd day of December 1974.

(SEAL)
Attest:

McCOY M. GIBSON JR.
Attesting Officer

C. MARSHALL DANN
Commissioner of Patents

USCOMM-DC 60376-P69
☆ U.S. GOVERNMENT PRINTING OFFICE : 1969 O—366-334.